United States Patent
Lee et al.

(10) Patent No.: US 8,909,467 B2
(45) Date of Patent: Dec. 9, 2014

(54) TOWER CRANE NAVIGATION SYSTEM

(75) Inventors: Ghang Lee, Seoul (KR); Joon Beom Cho, Seoul (KR); Tae Kwan Lee, Seoul (KR); Sung Il Ham, Namyangju-si (KR); Su Yeul Park, Seoul (KR); Kang Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 259 days.

(21) Appl. No.: 13/995,286

(22) PCT Filed: Jun. 7, 2011

(86) PCT No.: PCT/KR2011/004141
§ 371 (c)(1),
(2), (4) Date: Jun. 18, 2013

(87) PCT Pub. No.: WO2011/155749
PCT Pub. Date: Dec. 15, 2011

(65) Prior Publication Data
US 2013/0345857 A1 Dec. 26, 2013

(30) Foreign Application Priority Data

Jun. 7, 2010 (KR) .......................... 10-2010-0053341
Apr. 14, 2011 (KR) .......................... 10-2011-0034570

(51) Int. Cl.
*B66C 15/04* (2006.01)
*B66C 13/48* (2006.01)
*G01S 5/16* (2006.01)
*G01S 19/51* (2010.01)

(52) U.S. Cl.
CPC . *B66C 13/48* (2013.01); *G01S 5/16* (2013.01); *G01S 19/51* (2013.01); *B66C 15/04* (2013.01)

USPC ............................................ 701/301; 700/255

(58) Field of Classification Search
CPC ........ B66C 13/18; B66C 13/46; B66C 13/48; B66C 15/04; G01S 19/51; G01S 5/16; B25J 9/1676; G05B 2219/45046; G05B 2219/49139
USPC ........................... 701/117, 301; 700/255, 302
See application file for complete search history.

(56) References Cited

U.S. PATENT DOCUMENTS

2010/0070179 A1 * 3/2010 Cameron ...................... 701/301

FOREIGN PATENT DOCUMENTS

JP        407017684 A  *  1/1995
JP        2005-029338     2/2005

(Continued)

*Primary Examiner* — Mary Cheung
*Assistant Examiner* — Rodney Butler
(74) *Attorney, Agent, or Firm* — Lexyoume IP Meister, PLLC

(57) ABSTRACT

A material position information measuring section measures a position of a material lifted up by a tower crane. A structure information measuring section measures position information about surrounding structures. A route searching section searches for a route of movement of the material from a start point to a destination. The route of movement determined by the route searching section is stored in a route storage. A data processor receives data of the material position information measuring section and the structure information measuring section, and calculates 2D or 3D image data about relative positions of the tower crane, the material lifted up by the tower crane and the surrounding structures. A display unit displays information about at least one of the tower crane, the material and the surrounding structures using the image data calculated by the data processor, and displays the route of movement determined by the route searching section.

22 Claims, 17 Drawing Sheets

(56) References Cited

FOREIGN PATENT DOCUMENTS

| JP | 2005029338 A | * | 2/2005 |
| JP | 2007-015842 | | 1/2007 |
| KR | 1020070112316 | | 11/2007 |
| KR | 1020090072330 | | 7/2009 |
| KR | 1020120008369 | | 1/2012 |

* cited by examiner

Image of 1st rotation mode

Image of 2nd rotation mode

TOWER CRANE NAVIGATION SYSTEM

BACKGROUND OF THE INVENTION

1. Field of the Invention

The present invention relates to an apparatus for allowing a tower crane to be safely operated, and more particularly, to a system which provides a safe route for moving materials and a display screen to a tower crane operator so that the operator can safely operate the tower crane when one or more tower cranes are disposed at a construction site for a building.

2. Description of the Related Art

A machine, such as a tower crane, which moves objects (materials) used in construction, is required to keep out of surrounding structures while moving such materials. Therefore, a tower crane operator needs to be heavily focused. However, with a larger crane such as a tower crane, a crane operator can only have a narrow view, and it is difficult to continuously confirm surrounding structures and objects used in construction with the naked eye.

In order to overcome this problem, some conventional tower cranes provide a fixed side view of the tower crane on an auxiliary device as well as information about, for example, the angle of rotation, the height of the tower crane and the length of the tower crane. However, since the auxiliary device merely provides simple information pertaining to the operation of the tower crane, it is difficult for the operator to visually recognize the information on the display screen, which is problematic.

In particular, a plurality of tower cranes at a large construction site are in danger of colliding with each other. Therefore, the tower cranes are arranged with predetermined distances from each other with no danger of collision. However, this arrangement causes a problem of unreachable areas to which the tower crane cannot lift up materials, thereby hindering the punctual pace of construction.

The information disclosed in the Background of the Invention section is only for the enhancement of understanding of the background of the invention, and should not be taken as an acknowledgment or any form of suggestion that this information forms a prior art that would already be known to a person skilled in the art.

SUMMARY OF THE INVENTION

Accordingly, the present invention has been made keeping in mind the above problems occurring in the related art, and the present invention proposes a tower crane navigation system, which his intended to realize the following objectives.

First, it is intended to provide various types of views around the tower crane using a display in the tower crane, so that an operator can safely operate the tower crane.

Second, it is intended to search for safe routes of movement from the start point to the destination of the tower crane, so that the operator can safely move the materials of the tower crane along the predetermined route of movement.

Third, it is intended to generate an alarm when the present route of movement of the tower crane incurs a danger of colliding with a surrounding structure and further stop the tower crane at very dangerous situation, so that the tower crane does not collide with any surrounding structures.

Fourth, it is intended to provide necessary views to each tower crane when a plurality of tower cranes are arranged at a construction site in order to prevent a collision between the tower cranes in each route of movement of the tower cranes.

The objects of the present invention are not limited to those mentioned above, and the other objects which have not been mentioned above will be fully apparent to a person having ordinary skill in the art from the following description.

In order to achieve the above object, according to one aspect of the present invention, there is provided a tower crane navigation system that includes: a material position information measuring section for measuring a position of a material lifted up by a tower crane; a structure information measuring section for measuring position information about structures within and/or beyond a working radius of the tower crane; a route searching section for searching for a route of movement of the material lifted up, from a start point to a destination; a route storage for storing the route of movement determined by the route searching section with respect to each tower crane; a data processing section for receiving data from the material position information measuring section and data from the structure information measuring section, and for calculating two-dimensional (2D) or three-dimensional (3D) image data which provides information about relative positions of the tower crane, the material lifted up by the tower crane and the surrounding structures; and a display unit for displaying information about at least one selected from the group consisting of the tower crane, the material lifted up by the tower crane and the surrounding structures, using the image data calculated by the data processor, and for displaying the route of movement determined by the route searching section, wherein the structure information measuring section measures the position information about the structures within and/or beyond the working radius of the tower crane using the structure data providing section.

According to an embodiment of the invention, when two or more tower cranes are operative, the route searching section searches for routes of movement of each of the tower cranes, and when at least portions of the routes of movement of the tower cranes overlap each other, the route searching section re-sets the routes of movement of the tower cranes so that no routes of movement overlap each other.

According to the present invention, the routes of movement of the tower cranes are characterized to be re-set such that a sum of the routes of movement of the tower cranes is a minimum value.

According to the present invention, the route searching section is characterized to search for the route of movement by carrying out one mode selected from the group consisting of a safety first mode, a productivity first mode and a previous route mode.

According to the present invention, the safety first mode is characterized to select one route of movement, in which a distance between the tower crane and structures is greatest, among routes of movement along which the tower crane is maneuverable without colliding with the structures situated between the start point and the destination.

According to the present invention, the productivity first mode is characterized to select one route of movement, which has a shortest distance of travel while a distance between the tower crane and structures is equal to or greater than a reference distance, among routes of movement along which the tower crane is movable without colliding with the structures between the start point and the destination.

According to the present invention, the previous route mode is characterized to select one route of movement along which the tower crane moved previously.

According to the present invention, the selected route of movement of the material of the tower crane is characterized to be compensated for in consideration of positional displacements of the material which are calculated from multiple variables, including a direction and speed of wind, which are externally provided in real time or measured by a wind speed sensor and a wind direction sensor disposed on the tower crane, and a weight of the material which is lifted up by the tower crane.

According to the present invention, the tower crane navigation system may also include a control section for controlling the tower crane using the data from the material position information measuring section, the structure information measuring section and the route searching section.

According to the present invention, when two or more tower cranes which are operative and the routes of movement of the tower cranes determined by the route searching section overlap partly each other, the control section is characterized to control the tower cranes having the overlapping path of the routes of movement to pass through the overlapping path at different time slots.

According to the present invention, the material position information measuring section is characterized to include at least one selected from the group consisting of a global positioning system (GPS) device, a camera, a laser sensor, an angle sensor, a slewing sensor, a load cell and an encoder sensor.

According to the present invention, the structure information measuring section is characterized to comprise a structure data providing section for presenting the position information about the structures depending on schedules of the structures.

According to the present invention, the structure data providing section is characterized to provide a three-dimensional structure data which is updated depending on a progress of the schedules of the construction.

According to the present invention, the tower crane navigation system also is characterized to include comprising an alarming section for generating a route deviation alarm when an actual route of movement of the material deviates from the route of movement determined by the route searching section.

According to the present invention, when the route deviation alarm is generated, the display unit is characterized to display content of the alarm and a route of movement along which the tower crane is to return to the predetermined route of movement.

According to the present invention, the tower crane navigation system may also include an alarming section for generating a collision danger alarm when the tower crane reaches closer than a reference distance to the structure in which the tower crane is expected to collide with the structure, based on the data of the material position information measuring section.

According to the present invention, when the collision danger alarm is generated, the display unit is characterized to display content of the alarm on a screen and displays a returning route along which the tower crane is to avoid a collision.

According to the present invention, the display unit is characterized to display at least one piece of information selected from the group consisting of a route of movement determined by the route searching section, a direction of movement of the tower crane, a speed of movement of the tower crane and the information about the structures using a head-up display (HUD) method.

According to the present invention, the display unit is characterized to display information about the tower crane, the material lifted up by the tower crane or the structures, on a separate display, or with a head-up display (HUD) using augmented reality technology in a tower crane cabin.

The tower crane navigation system according to an embodiment of the invention provides the tower crane operator with a side view image of the tower crane and the surrounding structures, a top down view image of the tower crane and the surrounding structures and a top down view image of the material taken by the camera disposed on the tower crane, so that the operator can easily and safely operate the tower crane.

The tower crane navigation system according to an embodiment of the invention provides one image, which is selected by the operator among from the side view image of the tower crane and the surrounding structures, the top down view image of the tower crane and the surrounding structures and the top down view image of the material taken by the camera disposed on the tower crane, on a large screen or the full screen, so that the operator can safely operate the tower crane using the screen necessary to the operation, thereby increasing the working speed.

The tower crane navigation system according to an embodiment of the invention allows the operator to select one route from among a variety of available routes of movement from the start point to the destination, so that the operator can safely carry out the task with excellent productivity.

The tower crane navigation system according to an embodiment of the invention compensates for the route of movement in real time considering the direction and speed of the wind in the process of searching for the route of movement, so that the operator can safely carry out the task without a danger of colliding with any structure around the tower crane.

The tower crane navigation system according to an embodiment of the invention generates an alarm when the tower crane is in a danger of colliding with a surrounding structure and controls the tower crane to stop at a moment when danger is imminent, so that the operator can take measures to safely carry out the task.

The tower crane navigation system according to an embodiment of the invention determines in advance the route of movement of each tower crane when a plurality of tower cranes are arranged so that the routes of movement do not overlap each other. Even in cases where some of the routes of movement overlap each other, times at which the tower cranes move are adjusted accordingly, thereby preventing collisions from occurring.

The effects of the present invention are not limited to those mentioned above, and the other effects which have not been mentioned above will be fully apparent to a person having ordinary skill in the art from the following description.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in detail to various embodiments of the present invention, examples of which are illustrated in the accompanying drawings and described below. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

While terms such as "first," "second," "A" and "B" can be used in describing various elements, it should be understood that these terms do not limit those elements but merely discriminate those elements from others. For instance, first element can be named the second element, and vice versa, without departing the scope of protection of the present invention. The term "and/or" shall include the combination of a plurality of listed items or any of the plurality of listed items.

Unless clearly used otherwise, some expressions in the singular number may include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter a tower crane navigation system according to an embodiment of the invention will be described in detail with reference to the drawings.

Before the present invention is described in detail with reference to the drawings, it should be understood that constituent elements of the present invention are merely distinguished according to their main functions. Specifically, two or more constituent elements that will be described later may be combined into one constituent element, or one constituent element may be divided into two or more constituent elements having more specified functions. Each constituent element that will be described later may additionally carry out some or all of the functions of another constituent element in addition to its main function, or some of the main functions of one constituent element may be carried out exclusively by another constituent element. Therefore, the presence of the constituent elements which will be described herein should be interpreted based on their functions. The configuration of the constituent elements of the tower crane navigation system according to the present invention may be different from FIG. 1 as long as they can realize the object of the present invention.

Figure 1:
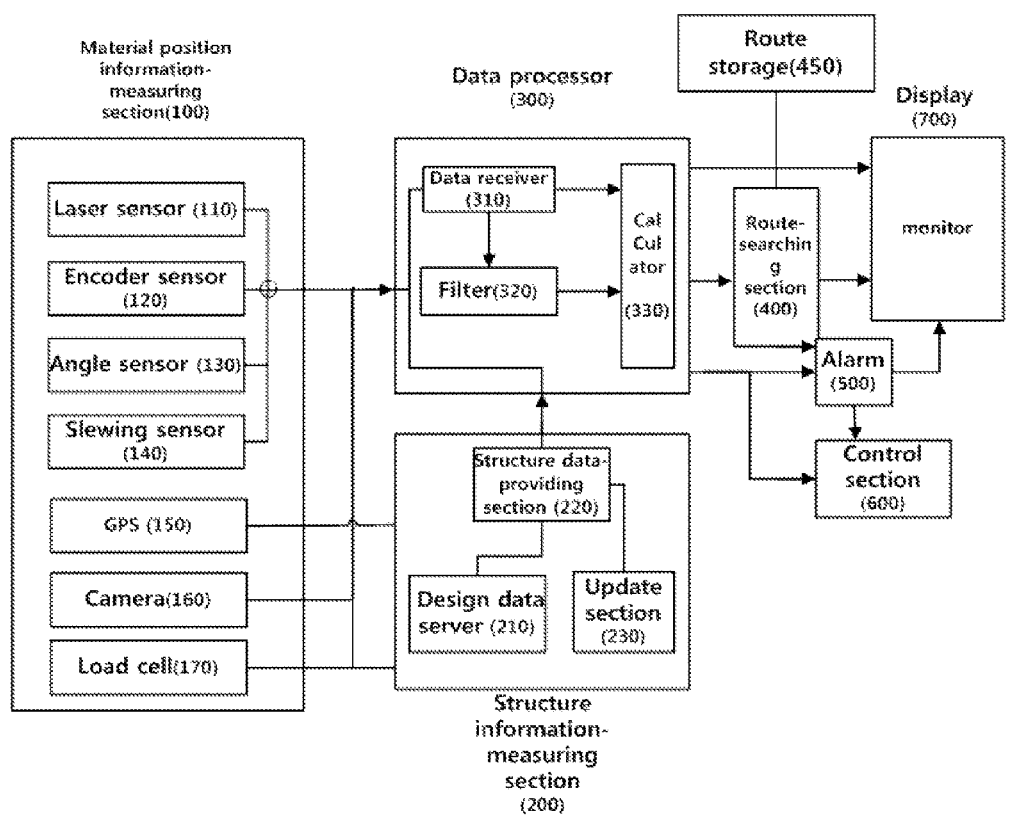
FIG. 1 is a block diagram schematically showing the configuration of a tower crane navigation system according to an embodiment of the invention.

FIG. 1 is a block diagram schematically showing the configuration of the tower crane navigation system according to an embodiment of the invention.

The tower crane navigation system according to the invention includes a material position information measuring section 100 for measuring the position of a material which is being lifted up by a tower crane; a structure information measuring section 200 for measuring position information about structures within and/or beyond the working radius of the tower crane; a route searching section 400 for searching for a route of movement of the material to be lifted up from a departure to a destination; a route storage 450 in which the routes of movement determined by the route searching section 400 are stored with respect to the tower cranes; a data processing section 300 for receiving data from the material position information measuring section 100 and data from the structure information measuring section 200, and for calculating two-dimensional (2D) or three-dimensional (3D) image data indicating relative positional information with respect to the tower crane, the material lifted up by the tower crane and the surrounding structures; and a display unit 700 for displaying information of at least one selected from among the tower crane, the material lifted up by the tower crane and the surrounding structures using the image data produced by the data processing section 300, and for displaying the route of movement searched for by the route searching section 400.

The material position information measuring section 100 is a component which locates the material which is to be lifted up by a material hoist of the tower crane. It is preferred that the material hoist of the tower crane be implemented as a hook or the like.

The material position information measuring section 100 includes at least one selected from among a global positioning system (GPS) device 150, a camera 160, a laser sensor 110, an angle sensor 130, a slewing sensor 140, a load cell 170 and an encoder sensor 120, installed on the tower crane.

The structure information measuring section 200 is a component which measures the position information pertaining to the vertical position of structures positioned within the working radius of the tower crane, and structures as well as geographical features positioned beyond the working radius of the tower crane around the working radius.

The data processing section 300 is a device which calculates the position of the tower crane, the position of the material to be lifted up and the positions of the surrounding structures based on data received from the material position information measuring section 100 and the structure information measuring section 200, and converts the data into a 2D or 3D image.

The data processing section 300 includes a data receiver 310 which receives the data transmitted from the material position information measuring section 100 and the structure information measuring section 200, a filter 320 which filters at least a part of the received data, if required, and a calculator 330 which calculates the positions of the tower crane, the material on the tower crane and the surrounding structures based on the received data and/or the filtered data. According to the present invention, the data can be transmitted and/or received as wired or wireless.

An image data of the camera 160 or data from the GPS 150 can be processed after being filtered. Filtering of the image data of the camera 160 can include, for example, changing a color, adjusting brightness, and removing an unnecessary image. The data from the GPS 150 can be subjected to filtering which make use of only a necessary part from among various provided data, or to filtering for integrity of a radio signal, and so on.

The position of the tower crane, the position of the material that to be lifted up by the tower crane and the positions of the structures around the tower crane are relative positions with respect to a reference point. It is basically preferable that the relative positions be calculated with respect to the axis of rotation of a turntable of the tower crane. In this case, it is typical that the axis of rotation of the tower crane be positioned at the center of the display unit 700.

As an alternative, the position can be calculated with respect to the material that to be lifted up by the tower crane, or to a specific part of a structure that is being constructed by the tower crane. Furthermore, when a plurality of tower cranes is used, the position calculation can be processed with respect to different tower cranes.

When a plurality of tower cranes is disposed, the position of the material and the positions of the surrounding structures are determined with respect to each tower crane. Since it is preferable to display operation-related information to each of the tower cranes, each tower crane is preferably provided with respective elements of the material position information measuring section 100, the structure information measuring section 200, the route searching section 400, and so on.

Figure 2:
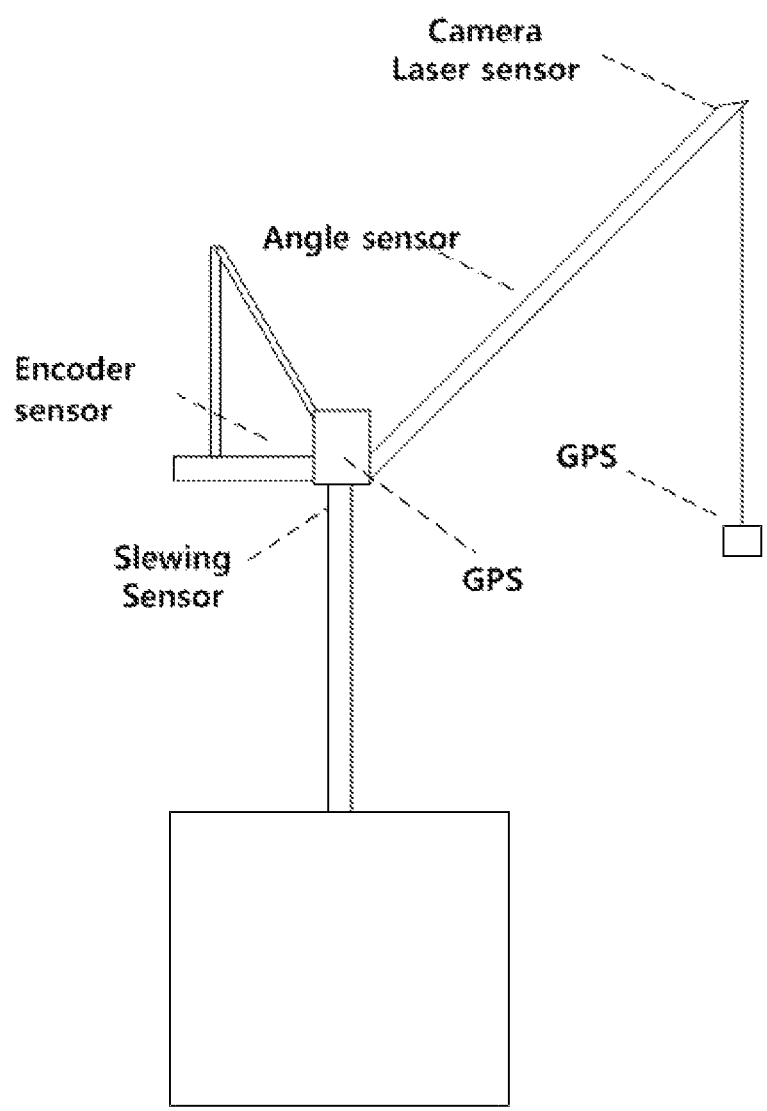
FIG. 2 shows sensors and devices which constitute the material position information measuring section of the tower crane navigation system according to an embodiment of the invention.

FIG. 2 shows sensors and devices which constitute the material position information measuring section 100 of the tower crane navigation system according to an embodiment of the invention.

As described above, the material position information measuring section 100 includes the GPS device 150, the camera 160, the laser sensor 110, the angle sensor 130, the slewing sensor 140, and the encoder sensor 120.

As shown in FIG. 2, the GPS device 150 is preferably disposed on the material hoist. Based on the satellite information, points of the tower crane and the material hoist on the map can be observable, and then it is possible to measure the distance of the material hoist from the ground. In addition, it is possible to dispose another GPS device 150 in the central portion of the tower crane in order to measure the horizontal distance from the center of the tower crane to the material hoist.

As an alternative, when two or more tower cranes work at a working site, the GPS devices 150 can be used in order to determine mutual positions of the tower cranes.

It is preferred that the camera 160 be implemented as a video camera 160 which can take a video. It is preferable to take images of the surrounding environment and structures with respect to the material hoist. According to an embodiment of the invention, it is possible to dispose the video camera 160 on the jib of the tower crane in order to take images. In order to take a top-down image to the material, the camera 160 may be disposed on the part of the jib at the top of the material hoist.

As an alternative, the camera 160 can be disposed on the material hoist in order to take images of the surroundings with the material or take images of the surrounding environment and structures without the material being seen. Furthermore, in this case, it is possible to take surrounding images at a variety of angles with respect to the material as well as the top down image to the material.

The laser sensor 110 is a device which measures distances to surrounding objects using a laser range measurer. It is possible to measure the distance from the ground to the material hoist by installing the laser sensor 110 on the material hoist.

As an alternative, a variety of devices to measure a distance can be used. For instance, an ultrasonic distance meter, a chirp spread spectrum (CSS)-based distance meter, an impulse radio ultra-wideband (IR UWB)-based distance meter, or the like can be used. Furthermore, the distance meter can be understood as including all types of distance meters that a person having ordinary skill in the art can selectively use.

The angle sensor 130 is a device which measures the vertical directional angle of the jib of the tower crane. The angle sensor 130 is disposed on the jib of the tower crane in order to measure angles, and is preferably implemented as a gyro sensor which can measure an angle with respect to the horizontal direction. Furthermore, a variety of sensors that measure an angle varying with respect to the direction of the gravity can be used.

The angle sensor 130 can be disposed at any position of the jib, since the device can operate normally as long as installed on places where the angle changes relative to the horizon.

As an alternative, the slewing sensor 140 which measures the degree of rotation of the rotary shaft of the jib with respect to the leveled position of the jib can be used to substitute the angle sensor 130.

In the meantime, the angle sensor 130 is not mounted on a tower crane (i.e., a fixed tower crane) which is configured such that the jib does not move in the horizontal direction.

The slewing sensor 140 of the tower crane serves to measure the angle of horizontal rotation of the tower crane. It is preferred that the angle of rotation be expressed as an angle with respect to true north on the map. Furthermore, the angle of rotation can be set with respect to a specific direction set by an operator.

It is preferred that the slewing sensor 140 be disposed on the central axis of the turntable of the tower crane. While the slewing sensor 140 is also preferably implemented as a gyro sensor which measures the degree of rotation with respect to a specific reference, it can be implemented as any one of various types of sensors which a person having ordinary skill in the art can employ.

As an alternative, it is possible to use the GPS device 150 as a means for substituting the slewing sensor 140 and measure at what angle the front of the tower crane is oriented with respect to the true north using a data through the GPS device 150.

The encoder sensor 120 is a device which measures the vertical travel distance of the material hoist (a hook). The material hoist is connected to the jib of the tower crane via a rope, and the length of the material hoist is adjustable. Typically, the material hoist moves up and down using a rotary motor which winds the rope and sheaves.

The encoder sensor 120 is a device which is coupled to the motor and detects the revolution count of the motor by outputting a voltage in proportion to the revolution count and sending the output voltage to a processing circuit. It is therefore preferred that the encoder sensor 120 of the tower crane be disposed on the rotary motor which winds the rope in order to measure the vertical travel distance of the material-lifting part.

The load cell is a device which measures the weight of the material that is lifted up. The load cell provides information about whether or not the weight of the material exceeds the maximum weight that can be lifted to the display unit 700, and is also used when compensating for the influence of the wind in the process of searching for a route for moving the material which will be described later.

Figure 3:
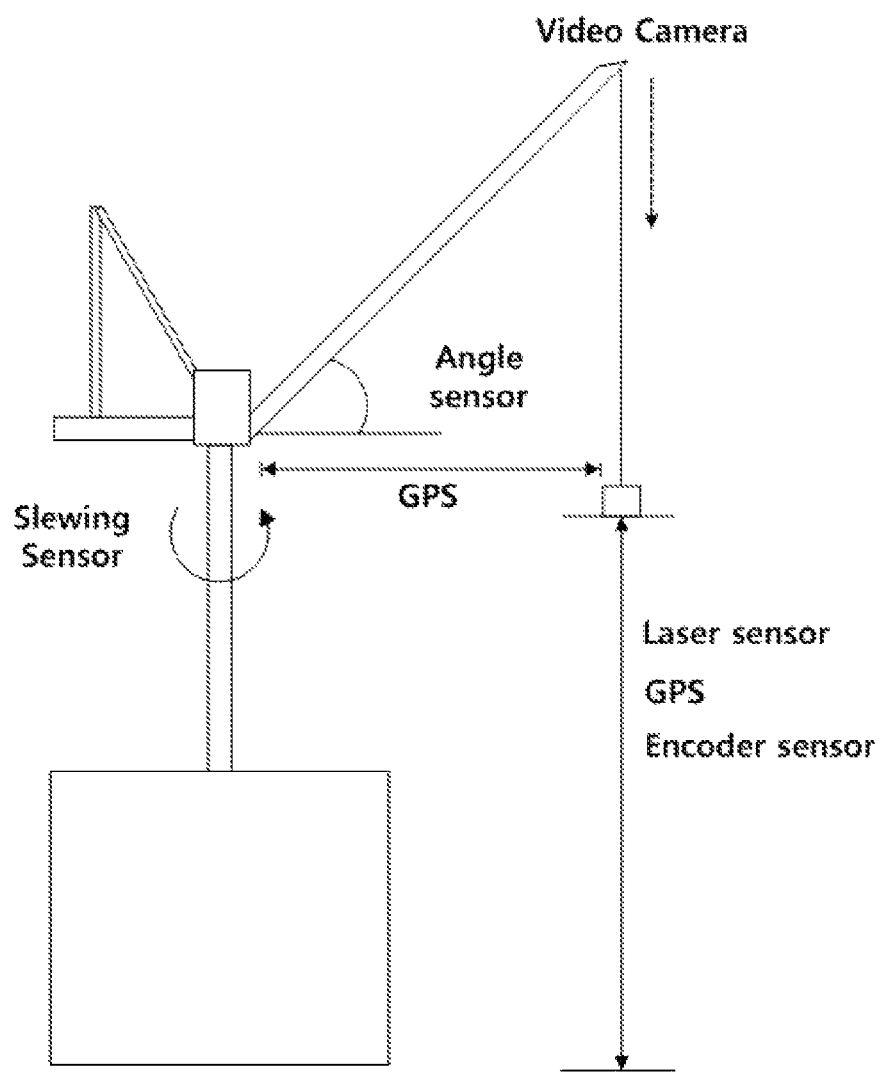
FIG. 3 schematically shows objects to be measured by the sensors constituting the material position information measuring section.

FIG. 3 schematically shows objects to be measured by the sensors constituting the material position information measuring section.

FIG. 3 shows an embodiment in which the camera 160 is disposed on the portion of the jib which is positioned vertically above the material hoist and takes a top down image. It can be appreciated that the laser sensor 110, the GPS device 150 and the encoder sensor 120 participate in measuring distances of the material hoist. The distances with respect to the material hoist can be measured in a variety of forms, such as a distance from the ground or a distance from the vertical jib.

The slewing sensor 140 measures the direction of rotation and the yawing angle of the central axis of the turntable of the tower crane, and the angle sensor 130 measures the pitching angle of the jib.

The distance from the central axis of the turn table of the tower crane to the material hoist can be measured by comparing the GPS device 150 disposed in the center of the tower crane and the GPS device 150 disposed on the material hoist. Furthermore, although not shown, it is possible to measure the distance from the central axis of the turntable of the tower crane to the material hoist through the vertical travel distance (position) of the material hoist obtained using the encoder sensor 120 and the pitching angle of the jib obtained using the angle sensor 130. In this case, the GPS device 150 on the central axis of the tower crane is not required.

The structure information measuring section 200 according to the invention is devised to measure the position information, pertaining to the vertical position of structures positioned within the working radius of the tower crane, and structures, geographical features, or so on positioned beyond the working radius of the tower crane around the working radius.

The position data about the structures around the tower crane are basically required to indicate the shapes of the surrounding structures, and furthermore, required to determine the possibility of the tower crane or the material held by the tower crane colliding with any of the surrounding structures.

To measure the structure information, two main factors can be used. The first factor is to use a 3D schedule data which is generated, with the passage of time, based on an original 3D design data of a structure. The second factor is to measure the position of an actual surrounding structure using a distance meter disposed on the tower crane. The latter case can measure not only the structure that is being constructed by the tower crane, but also the surrounding structures, the surrounding geographical features and the position of another tower crane.

According to an embodiment of the invention, the structure information measuring section 200 includes a structure data providing section 220 which presents the position information about the structures depending on the schedules of the structures. The structure data providing section 220 provides the position information about the structures which are within and beyond the working radius of the tower crane.

The structure data providing section 220 creates 3D structure data based on a structure design data stored in a design data server 210.

The structure data providing section 220 provides the 3D structure data, which will be updated in the course of the structure construction schedule being carried out. The update can be carried out in two ways by an update section 230.

First, the construction of a building is generally carried out according to a predetermined term of work. It is preferred that data based on a 3D drawing which was designed in advance be provided. In this case, the 3D structure data is produced by updating the design data simply according to passage of time. That is, the 3D structure data is created based on only the 3D design data which has been prepared in advance while designing the structure.

Second, since the construction schedule is not necessarily carried out according to a timetable, it is more preferable that the 3D structure data be created by checking the structure under construction in real time. This update can be carried out in real time by photographing the structure under construction using the camera 160 which is disposed around the structure.

In another embodiment, it is possible to update the 3D structure data by precisely measuring the position of the structure under construction using the distance meter disposed on the tower crane and comparing a measured data with the 3D design data which was prepared in advance.

In other embodiment, it is possible to create the 3D structure data using only a distance measuring section which determines the position and distance of surrounding structures using at least one distance meter disposed on the tower crane.

It is preferred that the distance meter may be one of a laser distance meter, an ultrasonic distance meter, a CSS distance meter or an IR UWB distance meter. However, this is not intended to be limiting, and examples for the distance meter include any distance meters that a person having ordinary skill in the art can commonly use.

The route searching section 400 is a component which produces the route for moving the material to be lifted up by the tower crane. FIG. 1 depicts the route searching section 400 as a component which searches for the route using a data sent from the data processor 300. Of course, as described above, the route searching section 400 can directly receive data from the material position information measuring section 100 and the structure information measuring section 200.

For the process of searching for the route of movement from the start point to the destination, the specification of the tower crane to be implemented is important. In other words, it is required to consider all of the height of the central axis of the turntable of the tower crane, the length of the jib of the tower crane, the ability of the jib to pitch in the vertical direction, the maximum pitching angle of rotation of the jib in the vertical direction, the maximum length of descending when the rope connected to the material hoist extends farthest, the yawing angle of horizontal rotation of the tower crane, the rotation speed of the tower crane, or so on. It is possible to inspect all of routes along which the tower crane can move by running a program (simulation) using the specification and performance of the tower crane as variables.

Figure 4:
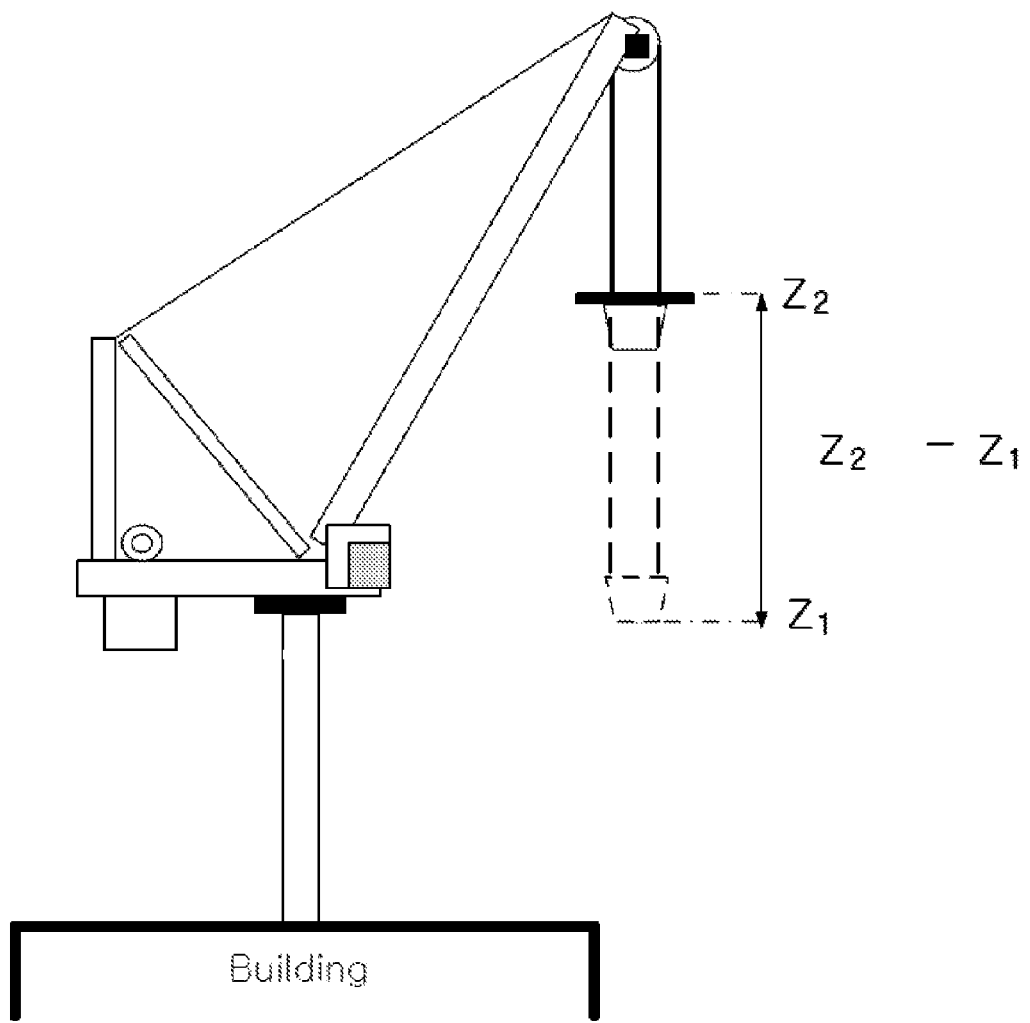
FIG. 4 shows variables for measuring vertical travel distance of the material hoist of the tower crane and an embodiment of a method of measuring the vertical travel distance.

FIG. 4 shows an embodiment which measures a travel distance of the material hoist of the tower crane upwardly and downwardly. The distance meter disposed on the material hoist or the jib can measure the distance between the material hoist of the tower crane and the structure under construction or the ground.

For example, as shown in FIG. 4, it is possible to calculate the vertical travel distance $Z_2-Z_1$ (in the vertical direction) of the material hoist by calculating the difference between a distance $Z_1$ from the material hoist to the ground before movement and another distance $Z_2$ from the material hoist to the ground after movement.

Figure 5:
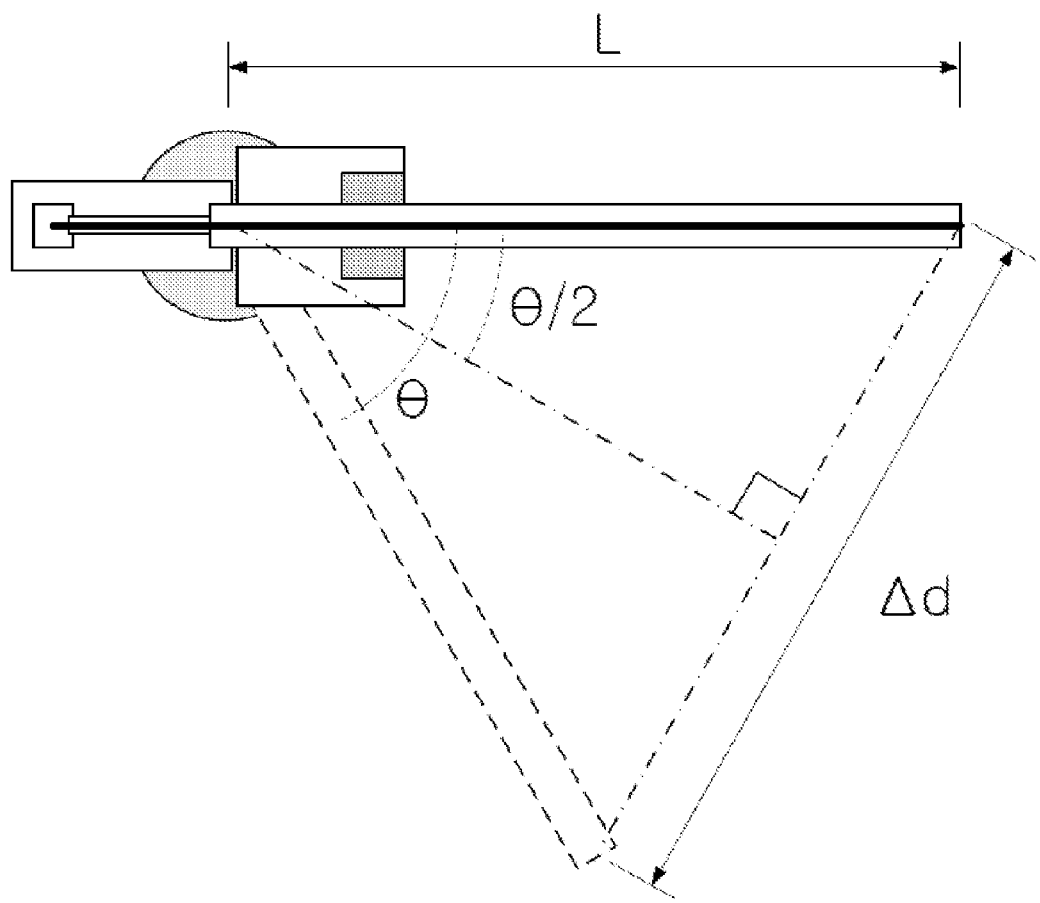
FIG. 5 shows variables for measuring a yawing distance or angle of yawing caused by horizontal rotation of the turntable of the tower crane and an embodiment of a method of measuring the horizontal rotation travel distance or the angle of yawing.

FIG. 5 shows variables for measuring a yawing distance or angle of yawing caused by horizontal rotation of the turntable of the tower crane. The angle of yawing θ of the central axis of the turntable can be measured using the slewing sensor 140.

The yawing distance of the jib following the yawing rotation of the turntable is measured based on a formula that has the maximum length L of the jib acquired from the specification of the tower crane and the angle of yawing rotation θ measured using the slewing sensor 140 as variables. That is, from a formula $\sin(\theta/2)=\Delta d/2L$, the yawing distance becomes $\Delta d=\sin(\theta/2)*2L$.

This is to calculate the yawing distance of the distal end of the jib, i.e. the jib. It is clear that, when it is required to measure a yawing distance of a specific portion of the jib, the yawing distance can be measured simply when the length of the corresponding portion is measured.

Reciprocally, when the yawing distance is measured using the distance meter disposed on the jib, the angle of yawing can be calculated from a formula $\theta=2\sin^{-1}(\Delta d/2L)$.

Figure 6:
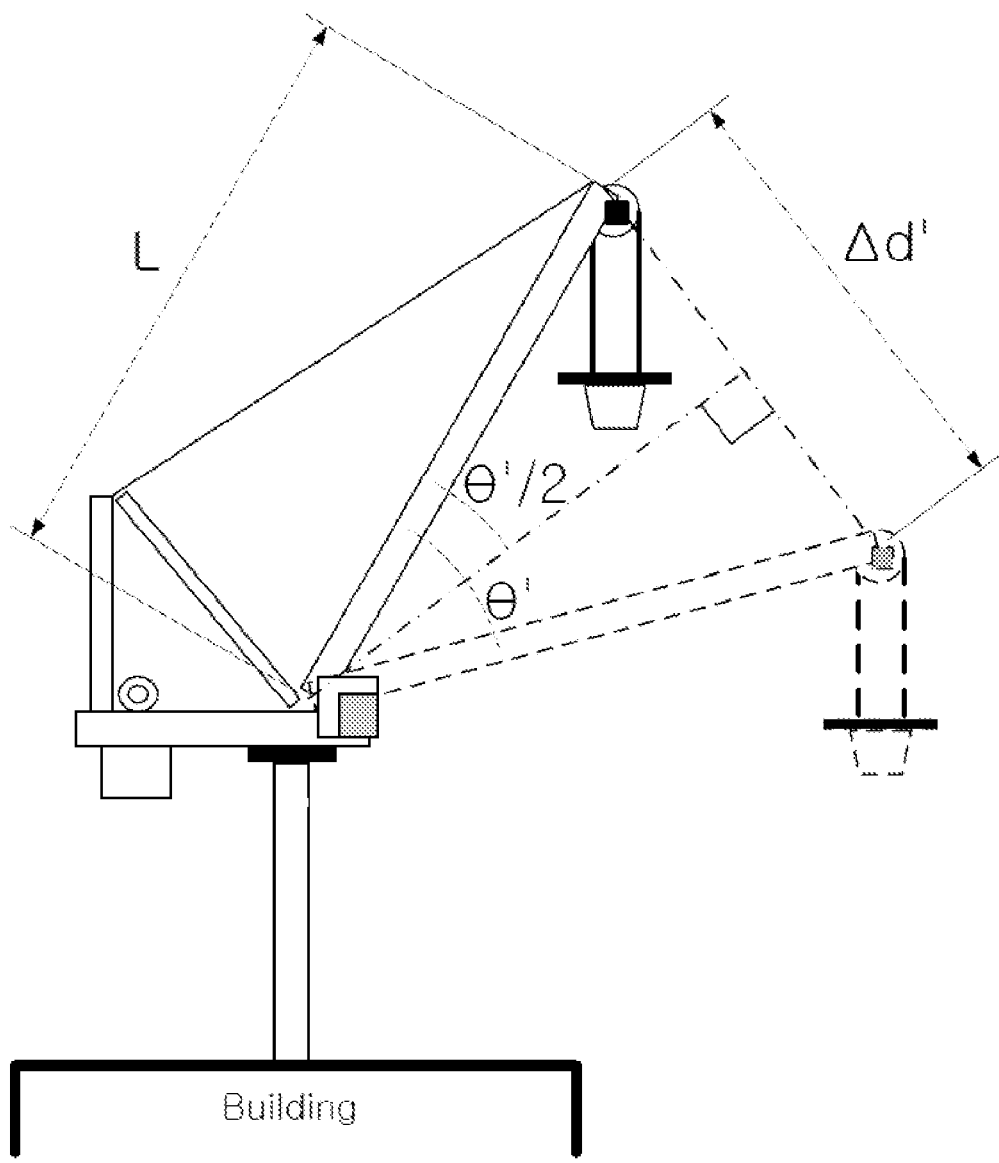
FIG. 6 shows variables for measuring a pitching distance or an angle of pitching caused by the vertical rotation of the jib of the tower crane and an embodiment of a method of measuring the pitching distance or the angle of pitching.

FIG. 6 shows an embodiment which measures a pitching distance or an angle of pitching according to the pitching rotation of the jib of the tower crane. The pitching distance or the angle of pitching can be measured using the angle sensor 130 on the rotary shaft connected to the body of the tower crane.

The pitching distance according to the pitching of the jib is measured based on a formula that has the maximum length L of the jib acquired from the specification of the tower crane and the angle of pitching θ' measured using the angle sensor 130 as variables. That is, from a formula $\sin(\theta'/2)=\Delta d'/2L$, the pitching distance becomes $\Delta d'=\sin(\theta'/2)*2L$.

It is clear that, when it is required to measure a pitching distance of a specific portion of the jib, the pitching distance according the pitching of the corresponding portion can be measured simply when the length of the corresponding portion is measured.

In contrast, when the pitching distance is measured using the distance meter disposed on the jib, the angle of pitching can be calculated from a formula $\theta'=2\sin^{-1}(\Delta d'/2L)$.

It is preferred that the start point and destination be inputted in advance using a keypad, a keyboard, a mouse or a touchscreen before the tower crane moves. That is, the operator checks the start point and destination on the screen and selects them before moving the material.

Figure 7A:
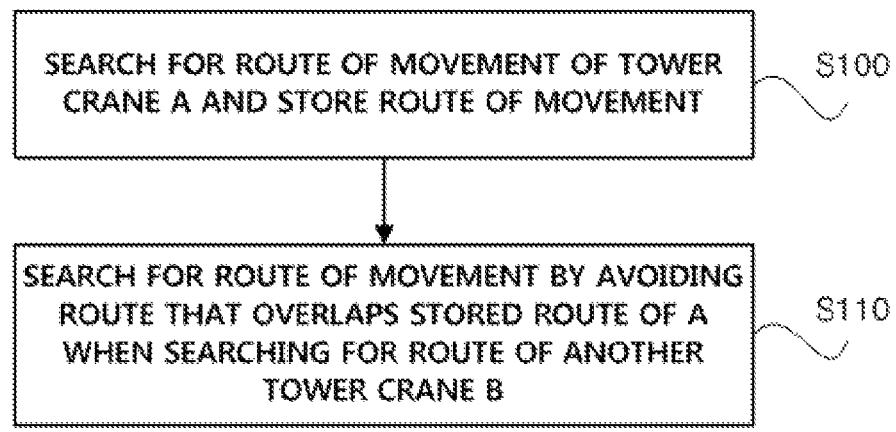
FIG. 7A and FIG. 7B are flowcharts showing the sequence of searching for a route for moving a material according to an embodiment of the invention.
Figure 7B:
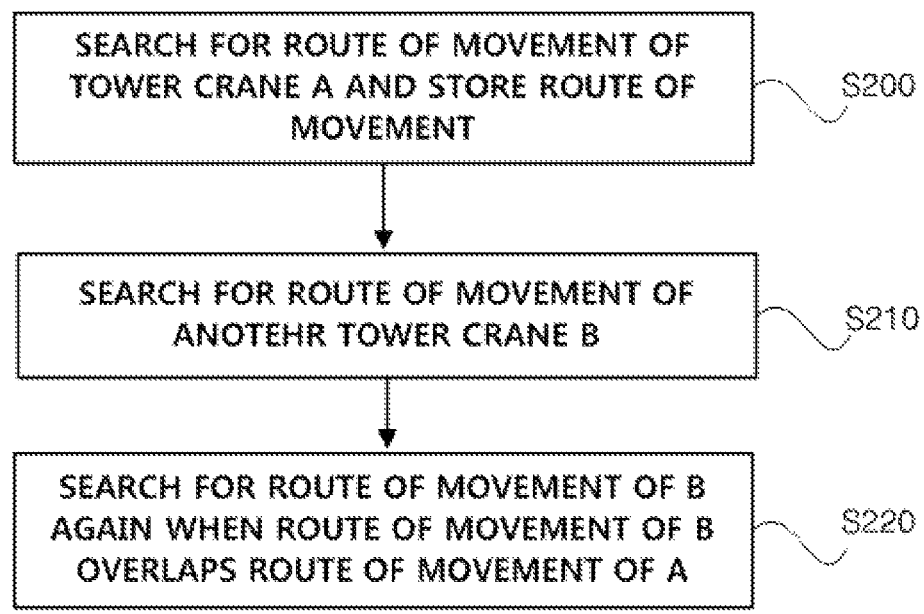

FIG. 7A and FIG. 7B are flowcharts showing the sequence of searching for a route for moving a material according to embodiments of the invention.

First, an example with only one tower crane is described. Although the start point and/or destination can be set by a variety of methods, basically, the operator can set the start point and/or destination. When the start point and/or destination are set, the route for moving the material can be calculated based on information about the surroundings of the tower crane. The route of movement can be calculated based on the maneuverable zone within which the tower crane can move, position information about the surrounding structures, present position information of the material, or so on. The maneuverable zone differs depending on the specification of each tower crane. As will be described later, the route of movement can be produced in accordance with a variety of standards.

When two or more tower cranes are disposed at a construction site, the tower crane navigation system can integrally manage the whole tower cranes. It is preferred, however, that the process of searching for the routes of movement be carried out with respect to each tower crane, since the start points and the destinations of the tower cranes are separately set rather than being set simultaneously.

The routes for movement searched for the tower cranes may have an overlapped path between them. The worst case is that the tower cranes collide with each other while each moving along the searched routes. Therefore, when two or more cranes have overlapped paths, an apparatus or method for avoiding the collision between the tower cranes is required.

Specifically, when two or more tower cranes are operating, the route searching section 400 searches for the routes for the tower cranes. When the routes for movement of the tower cranes overlap each other, the routes must be re-set in order not to overlap each other.

As shown in FIG. 7A, when a route of movement of one tower crane A is searched for and is then stored in the route storage 450, a route of movement of another tower crane B is preferably searched from among routes that do not overlap the route stored in the route storage 450. Alternatively, as shown in FIG. 7B, a shortest route of movement of one tower crane A is searched for, and is inspected whether or not it overlaps a route of movement for another tower crane B. When the routes overlap each other, a new route of movement of the tower crane B can be searched for.

Since the route storage 450 is used for searching for routes of different tower cranes, a storage medium such as a server, to which the route searching section 400 of any of tower cranes can access, is used. Alternatively, when the route searching section 400 is not disposed on each tower crane but one route searching section in the entire system searches for the route of each tower crane, a storage medium, to which one route searching section 400 can access as wired or wireless, is used.

When three or more tower cranes are used, the route of the present tower crane must be searched for in consideration of all routes stored in the route storage 450. When the routes of two or more tower cranes are to be re-set, the possibility of collision must be considered. In this case, it is preferred that the routes of movement be re-set such that a value adding up the entire routes of the tower cranes is minimum. Here, the speed of work across the entire construction site is considered.

It is preferred that the route stored in the route storage 450 be deleted when the corresponding tower crane has moved to the destination.

Even if the route of the tower crane A overlaps the route of the tower crane B, no accident occurs when the tower cranes pass through the overlapping route portion at different times. That is, in the case of controlling the two or more tower cranes, it is possible to determine in advance whether or not the routes of movement overlap each other and whether or not the tower cranes pass through the overlapping path within a time period during which they can collide with each other.

The tower crane navigation system can also include a control section 600 which controls the tower cranes using the data of the material position information measuring section 100, the structure information measuring section 200 and the route searching section 400. Furthermore, when two or more tower cranes are operating and the routes of the tower cranes determined by the route searching section 400 overlap each other, the control section 600 can control the tower cranes having the overlapping paths so that they move along the overlapping paths at different time slots.

For this, it is preferable to accurately obtain a time slot during which each tower crane passes through a specific area. It can be determined based on a variety of factors, among which the most important is a time at which the material is completely loaded by the material hoist. The time when the material is loaded by the material hoist can be determined by analyzing an image of the camera 160 which is disposed on or around the hook. That is, it is possible to determine the time at which the material is completely loaded based on the amount of remaining material to be loaded or whether the material needs much time to load or not. Or, if the operator set loading time in advance, the time may be determined using the set loading time.

Although the speeds of moving the tower crane upwardly, downwardly and laterally may differ depending on the handling of the operator, it is preferable to determine at which time the tower crane passes through the overlapping paths, based on an average speed of movement while carrying out the task. It is preferred that the tower crane be controlled such that it has a sufficient and safe time interval because time differences may be caused by the handling of the operator.

Additionally, in case that, after the route of movement of a tower crane A has been searched for, the operator of the tower crane A sets the operation to stop in order to stop briefly the operation, the route of movement of the tower crane A may not be utilized as grounds to determine whether it is over the overlapping paths or not, for the process of searching for the route of movement of another tower crane B.

As an alternative to the setting of the start point and destination, it is possible to select a point where the operator of the tower crane actually loaded the material as a basic start point and a point at which the material actually arrives as a basic destination. That is, the operator does not independently set the start point and the destination, but the start point and the destination are set depending on contents of a task. This is because the processes of moving materials frequently have the same start point and the same destination for a predetermined time.

The process of searching for the route according to the invention can take a variety of modes. For instance, the route search mode can be implemented as one selected from among a safety first mode, a productivity first mode and a previous route mode.

The safety first mode according to the invention preferably selects one route of movement from among routes of movement along which the tower crane can move without colliding with any structure between the start point and the destination, in particular, the route of movement in which the distance between the tower crane and the structure is greatest. The safety first mode is the route of movement for which the possibility of the tower crane colliding with any structure is lowest.

The productivity first mode according to the invention preferably selects the shortest route of movement from among routes of movement along which the tower crane can move without colliding with any structure between the start point and the destination.

In the case of the productivity first mode, the distance between the tower crane and the structure must be equal to or greater than a predetermined reference distance even though the shortest route of movement is selected. When the distance between the tower crane and the structure is several or tens of centimeters, it cannot be considered safe. Although this reference distance can be selectively inputted by the operator, the reference distance can be considered safe when securing at least several meters.

The previous route mode according to the invention preferably selects a route of movement that is the same as the previous route of movement along which the tower crane moved previously. When the start point and destination are the same, the previous route, which was proven to be a route along which the material was successfully moved without a collision, is provided.

Alternatively, the previous route can be one selected from among a plurality of routes, along which the materials of the tower crane were moved without a collision, according to a combination of the start point and the destination. When there are routes along which the operator of the tower crane previously moved the materials from a plurality of start points and/or to a plurality of destinations, the routes are stored in the route searching section 400, such that the operator can select one route from among the stored routes.

Alternatively, it is preferred that the route of movement of the material of the tower crane selected from among the various modes be compensated for in consideration of positional displacements of the material which are calculated from variables, including the direction and speed of the wind which are measured in real time and the weight of the material which is lifted up by the tower crane.

Since the tower crane is frequently operated at a considerable height, the direction and speed of the wind can be referred to as factors that must be considered for safe operation of the tower crane. According to physics, when the direction and speed of the wind and the weight of the material (precisely, the material and the material hoist) which is moved by the tower crane are measured, a displacement affecting the route of movement of the material can be calculated.

The speed and direction of the wind can be utilized when receiving externally observed data, or the tower crane can be provided with a sensor which measures the speed and direction of the wind. The weight of the material is measured using the load cell as described above.

The tower crane navigation system capable of searching for the route of movement of the material according to the invention can also include an alarming section 500 which generates a route deviation alarm when a route along which the material is moved by the tower crane deviates from the designated route determined by the route searching section 400.

Alternatively, the tower crane navigation system can also include an alarming section 500 which generates a collision danger alarm when the tower crane has moved closer than a reference distance in which the tower crane might collide with a structure, based on the data of the material position information measuring section 100 and the structure information measuring section 200. The collision danger alarm can be generated irrespective of the function of searching for the route of movement, and the tower crane navigation system without the function of searching for the route of movement of the material can also use the alarm.

It is preferred that, when the route deviation alarm is generated, the display unit 700 of the tower crane navigation system capable of searching for the route of movement of the material according to the invention display the content of the alarm on the screen and display a route of movement along which the tower crane is to return to the predetermined route.

It is preferred that, when the collision danger alarm is generated, the display unit 700 of the tower crane navigation system capable of searching for the route of movement of the material according to the invention display the content of the alarm on the screen and display a returning route along which the tower crane can move while avoiding a collision.

When an alarm is generated, the route from the present point to the destination can be searched for again when selected by the operator.

The display unit 700 according to the invention can display the route determined by the route searching section 400 on at least one selected from among a side view image of the tower crane and the surrounding structures, a top down view image of the tower crane and the structures and a top down view image of the material taken by the camera 160 disposed on the tower crane.

The route of movement of the material displayed on the image of the display unit 700 can be marked with a 2D or 3D solid line so that the operator can easily see it from the screen image.

As an alternative embodiment of the invention, the display unit 700 can display direction pointers which help move along the route determined by the route searching section 400 on at least one selected from among a side view image of the tower crane and the structures, a top down view image of the tower crane and the structures and a top down view image of the material that is provided by the camera 160 disposed on the tower crane.

That is, 2D or 3D arrows or notices are displayed on the image of the display unit 700 in order to present the route in real time. Furthermore, the searched route of movement of the material can be expressed by numerical values. It is possible to indicate how many meters the tower crane must move or at what degrees of angle the tower crane must rotate while pointing in the upward, downward, left or right direction. In addition, it is possible to indicate for how many seconds the tower crane must move so that the operator can easily perceive. Furthermore, such guidance can be provided not only with indications on the screen but also with voices.

The control section 600 according to the invention can control the material hoist of the tower crane to automatically move the material from the start point to the destination along the route determined by the route-searching section 400 and then to return to the start point along the searched route. That is, the tower crane is controlled so that it automatically moves along the searched route. Even if the tower crane is automatically operating, the operation can be converted into manual mode by the selection of the operator.

As an alternative, the control section 600 can stop the operation of the tower crane when the tower crane does not return to the indicated returning route after the collision danger alarm was generated.

It is possible to set in advance whether or not to stop depending on the selection of the operator. It is possible to momentarily stop the tower crane when the tower crane still moves along the dangerous route or has not moved for a predetermined time after the collision danger alarm has been generated.

When the tower crane is momentarily stopped, the operator can move the material again by restarting the tower crane after inspecting the route of movement.

According to the present invention, the tower crane operator can easily check the area, which was not easy to check by eye from within the cabin, and easily recognize the circumstances with regard to the movement of the tower crane. Therefore, the image of the material of the tower crane and the surrounding structures must be provided according to the situation of the operator. For this, the present invention provides a variety of display techniques.

Figure 8:
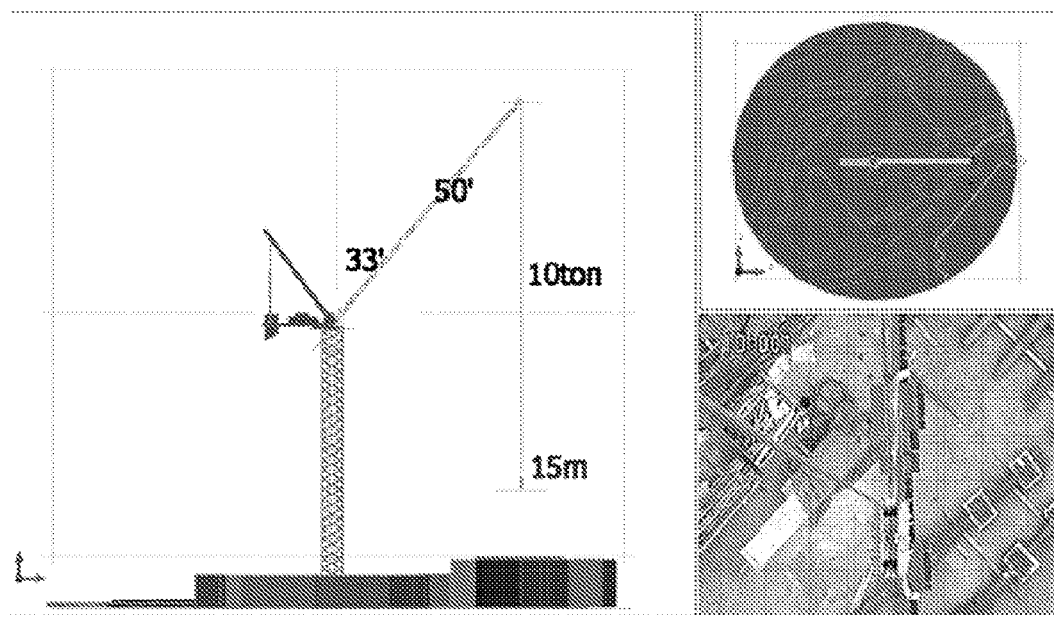
FIG. 8 shows the screen of the display according to an embodiment of the invention.

FIG. 8 shows the screen of the display unit 700 according to an embodiment of the invention. The display unit 700 according to the invention can operate in a first display mode in which at least two images selected from among a side view image of the tower crane and the surrounding structures, a top down view image of the tower crane and the surrounding structures and a top down view image of the material, that is provided by the camera 160 disposed on the tower crane, are presented in divided areas.

As an alternative, the display unit 700 can operate in a second display mode in which one image selected from among the side view image of the tower crane and the structures, the top down view image of the tower crane and the structures and the top down view image of the material, that is provided by the camera 160 disposed on the tower crane, is presented on one full screen.

Figure 9:
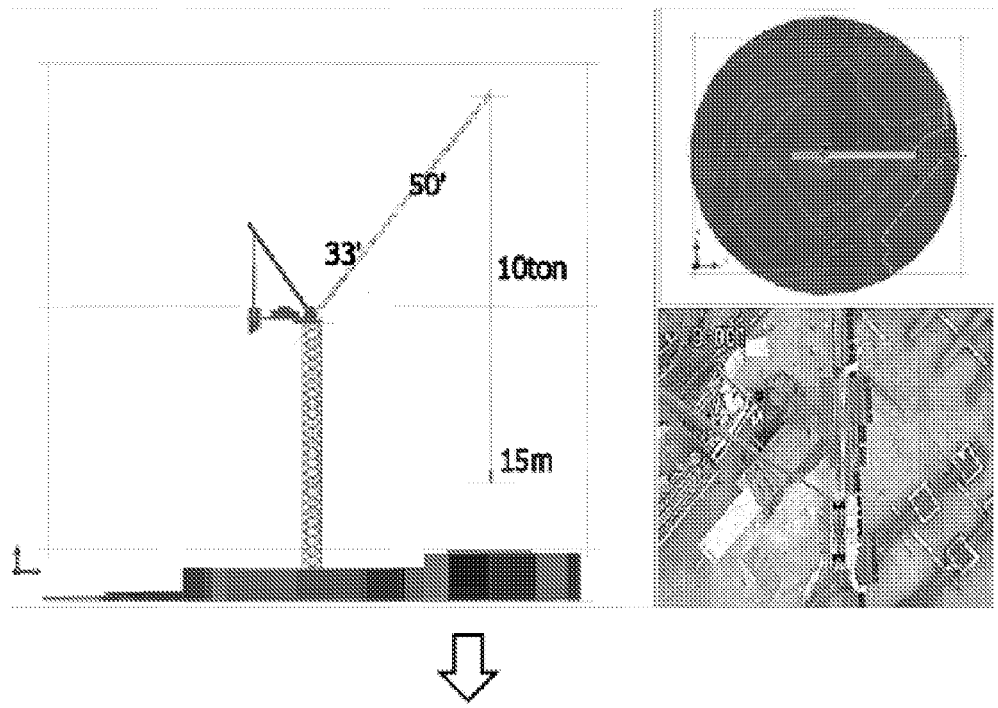
FIG. 9 shows an example of switchover between a first display mode and a second display mode according to an embodiment of the invention.
Figure 9:
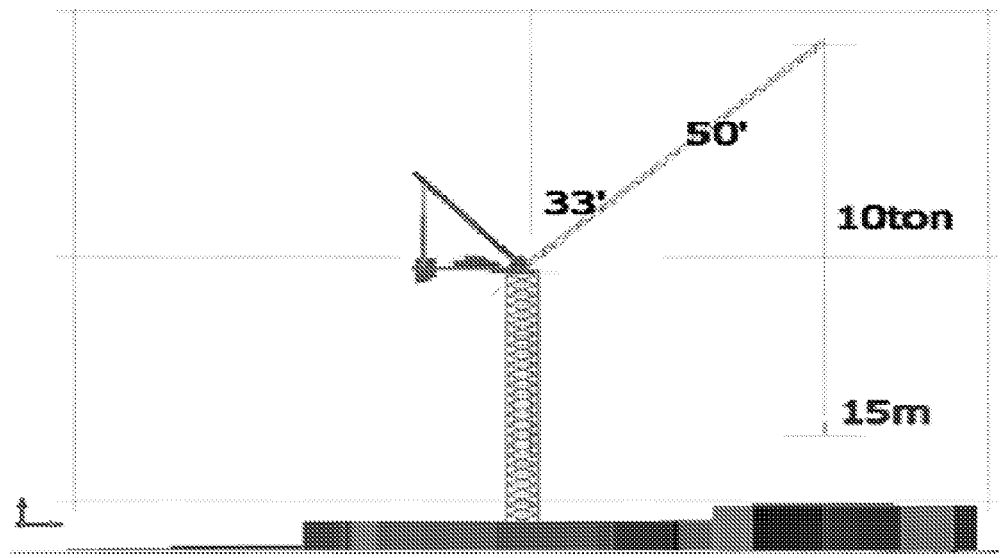

Furthermore, as shown in FIG. 9, the first display mode and the second display mode can be switched in response to an input of the user.

Herein, an input means of the user may be implemented as one selected from among a variety of input means, including a keyboard, a keypad, a mouse, a joystick, buttons, a touch screen and so on.

As an alternative, in the first display mode, it is preferred that the sizes of the divided areas in which the side view image of the tower crane and the surrounding structures, the top down view image of the tower crane and the surrounding structures or the top down view image of the material that is provided by the camera 160 disposed on the tower crane is realized can be adjusted.

Figure 10:
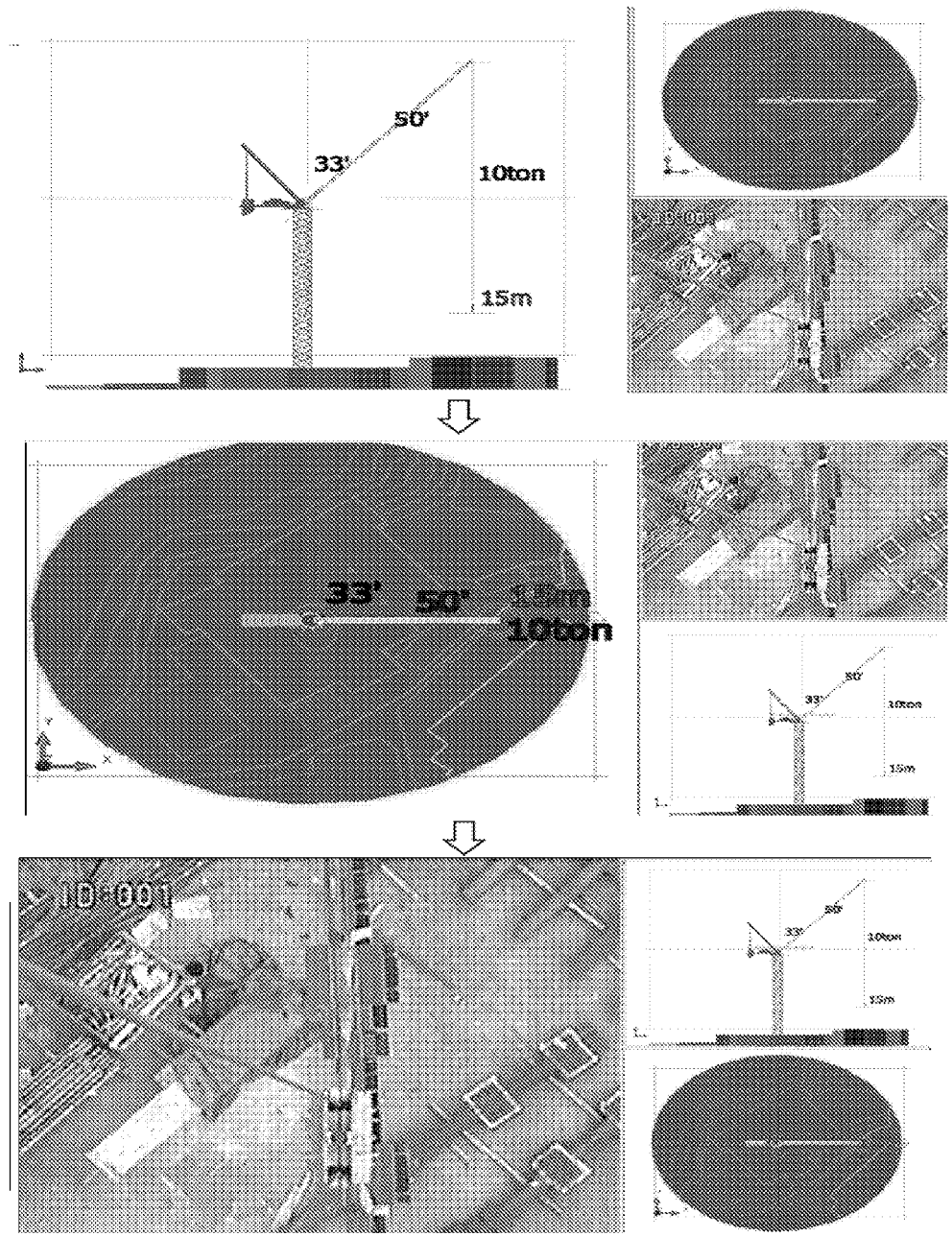
FIG. 10 shows an example of exchanging the positions of the divided screen areas of the display according to an embodiment of the invention.

As another alternative, as shown in FIG. 10, in the first display mode, it is preferred that the positions of the divided areas, in which the side view image of the tower crane and the structures, the top down view image of the tower crane and the structures or the top down view image of the material that is provided by the camera 160 disposed on the tower crane are displayed, can be exchanged with each other.

According to an alternative, it is preferred that the conversion between the first display mode and the second display mode, the adjustment of the sizes of the divided image areas in the first display mode, or the exchange of the mutual positions of the divided image areas be conducted by an input of the user.

According to another alternative, due to the conversion between the display modes, the adjustment of the sizes of the divided image areas, or the exchange of the mutual positions of the divided image areas, the screen can be automatically converted or changed into a screen that is mostly necessary for the operation of the tower crane.

It is preferred that at least one selected from among the side view image of the tower crane and the surrounding structures, the top down view image of the tower crane and the surrounding structures and the top down view image of the material, that is provided by the camera 160 disposed on the tower crane, be indicated with at least one piece of information selected from among the angle of yawing of the tower crane, the angle of pitching of the jib, the length of the jib, the height of the material hoist, the vertical distance from the jib to the material hoist, and the weight of the jib that is lifted up.

The indicated information can be selected by the operator, or the tower crane system can automatically indicate a piece of information necessary for the present operation. Otherwise, it is possible to display the most necessary information at present with a different color, with a thick style of type, or by flickering letters so that the information is noticeable.

Figure 11:
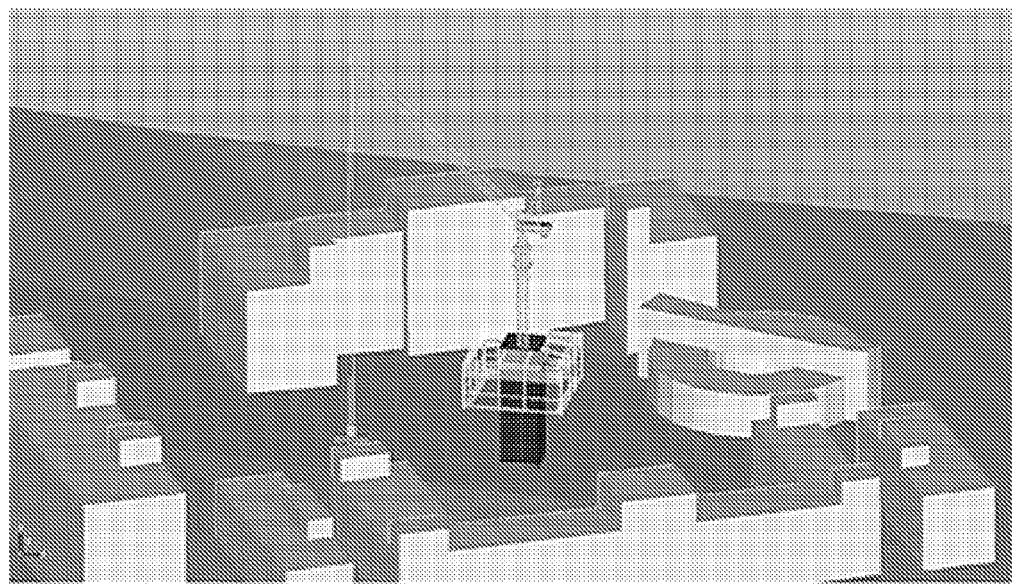
FIG. 11 shows a 3D side view of the tower crane and the surrounding structures according to an embodiment of the invention.

According to an embodiment of the invention, the side view image of the tower crane and the structures can be displayed in a 2D or 3D image. The 3D image can be expressed by a perspective view image which is observed at a predetermined reference angle. FIG. 11 shows a 3D side image of the tower crane and the surrounding structures according to an embodiment of the invention.

The reference angle at which the perspective view is formed ranges from 0° to 90° when the horizon is regarded as 0°. An angle ranging from about 30° to about 45° is preferable. This angle of inclination may be changed due to an input of the operator.

The 2D image is simple, and it is easy to intuitively recognize the 2D image. The 3D image makes it easy to locate an actual structure. In some cases of the 3D image, however, parts of the tower crane may be concealed or be displayed in a manner in which they are not easily recognized depending on the position of the structure and the direction and angle of yawing rotation of the tower crane.

According to another embodiment of the invention, in the side view image of the tower crane and the surrounding structures or the top down view image of the tower crane and the surrounding structures, the display of the image of each structure can be selected omitted and only the outline of each structure can be marked with dotted lines.

Figure 12:
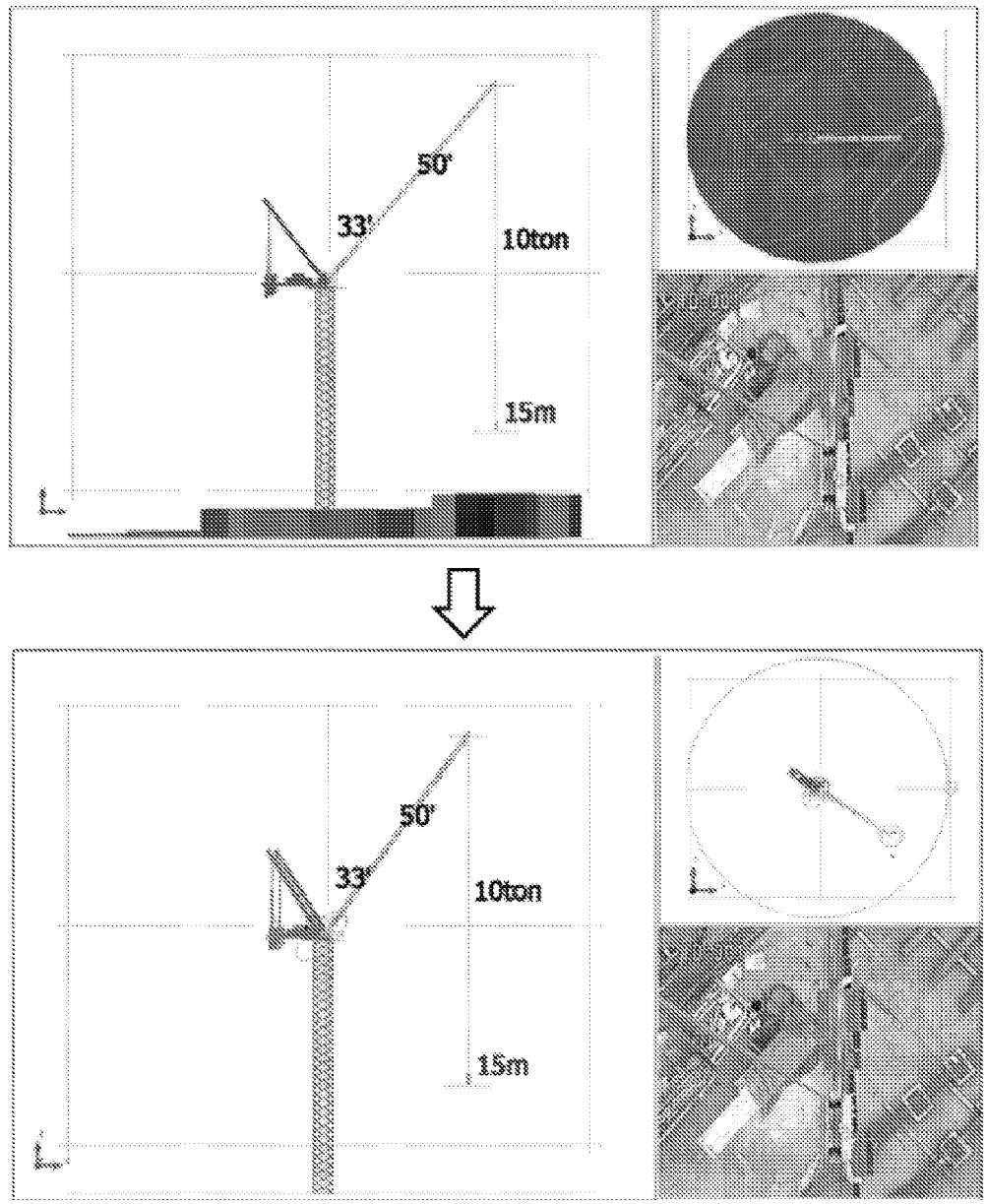
FIG. 12 shows the screen of the display for making visible or invisible the surrounding structures.

This makes it possible to prevent the situation in which the route of movement of the tower crane is rather difficult to inspect depending on the positions of the surrounding structures and the direction and angle of yawing rotation of the tower crane. FIG. 12 shows the screen of the display unit 700 on which a surrounding structure is displayed or hidden.

According to an embodiment of the invention, the top down view image of the tower crane and the surrounding structures can be displayed using a 2D image which is expressed with contour lines such that the heights of the tower crane and the structures can be identified.

The contour lines can be marked with different colors depending on the structures, the tower crane and the surrounding geographical features, with different colors depending on heights, using different thicknesses of lines depending on heights, or using a combination thereof.

Figure 13A:
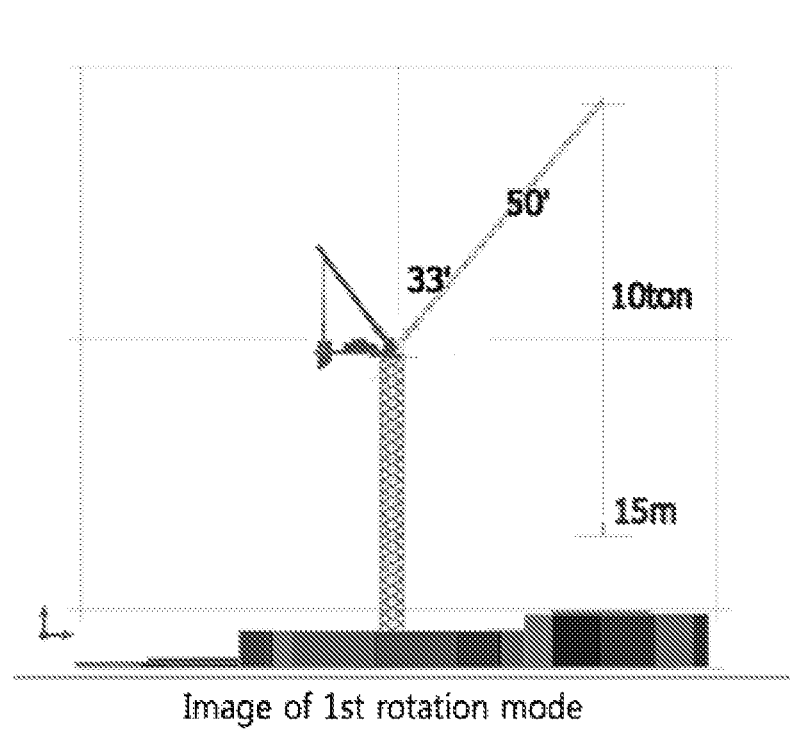
FIG. 13A shows an example in which, when the tower crane horizontally rotates, the surrounding structures are rendered as rotating while the tower crane is fixed on the screen, according to an embodiment of the invention (first rotation mode image)

According to an embodiment of the invention, when the tower crane rotates, the side view image of the tower crane and the surrounding structures or the top down view image of the tower crane and the surrounding structures can be displayed as a first rotation mode image in which the tower crane is fixed but the surrounding structures rotate, as shown in FIG. 13A.

Figure 13B:
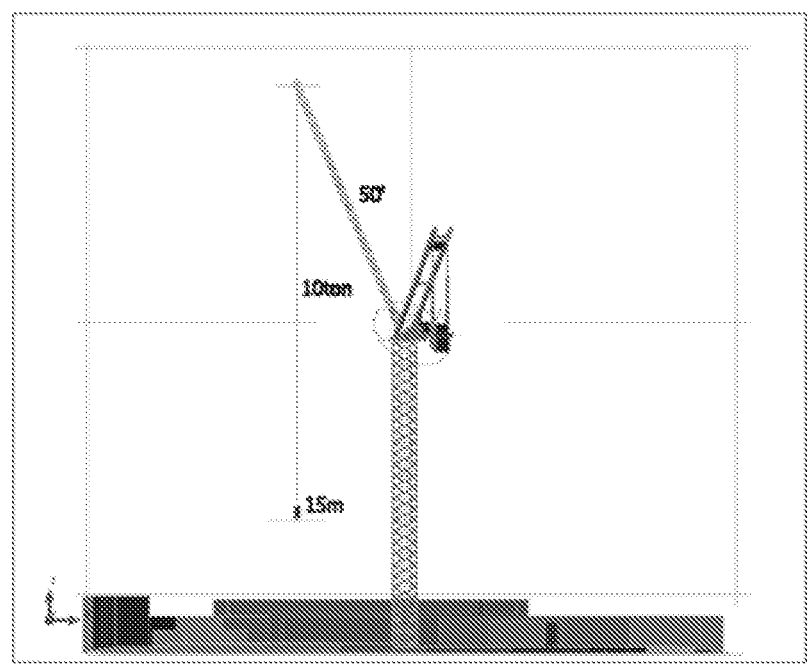
FIG. 13B shows an example in which, when the tower crane horizontally rotates, the tower crane is rendered as rotating while the surrounding structures are fixed on the screen, according to another embodiment of the invention (second rotation mode image)

According to another embodiment, as shown in FIG. 13B, when the tower crane rotates, the side view image of the tower crane and the surrounding structures or the top down view image of the tower crane and the surrounding structures can be displayed as a second rotation mode image in which the surrounding structures are fixed but the tower crane rotates. Furthermore, the first rotation mode image and the second rotation mode image can be switched over each other in an automatic process or due to an input of the user.

Figure 14:
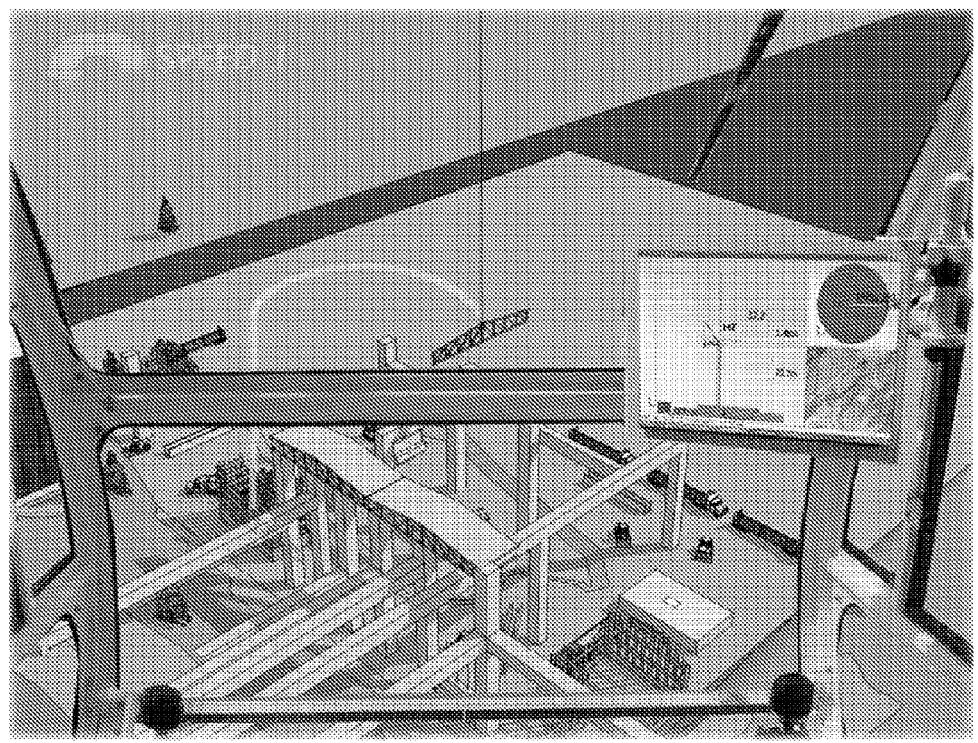
FIG. 14 is an imaginary view showing an example in which the display is realized using a head-up display (HUD) scheme according to an embodiment of the invention.

FIG. 14 is a forecast view showing an example in which the display unit 700 is implemented using a head-up display (HUD) scheme according to an embodiment of the invention. FIG. 14 provides a view seen from inside of the cabin.

The display unit 700 can display at least one selected from among the route determined by the route searching section 400, the direction in which the tower crane moves, the speed at which the tower crane moves, and the information about the structures in the HUD scheme. It is preferable that the HUD be realized through a window disposed in the cabin of the tower crane. Referring to FIG. 14, the direction of rotation and the level of speed (speed 1) of the tower crane are displayed on the top left, a route along which the material is to be moved is marked around the center, and the final destination is marked with imaginary lines. In the right part of FIG. 15, a typical display device is disposed.

Figure 15:
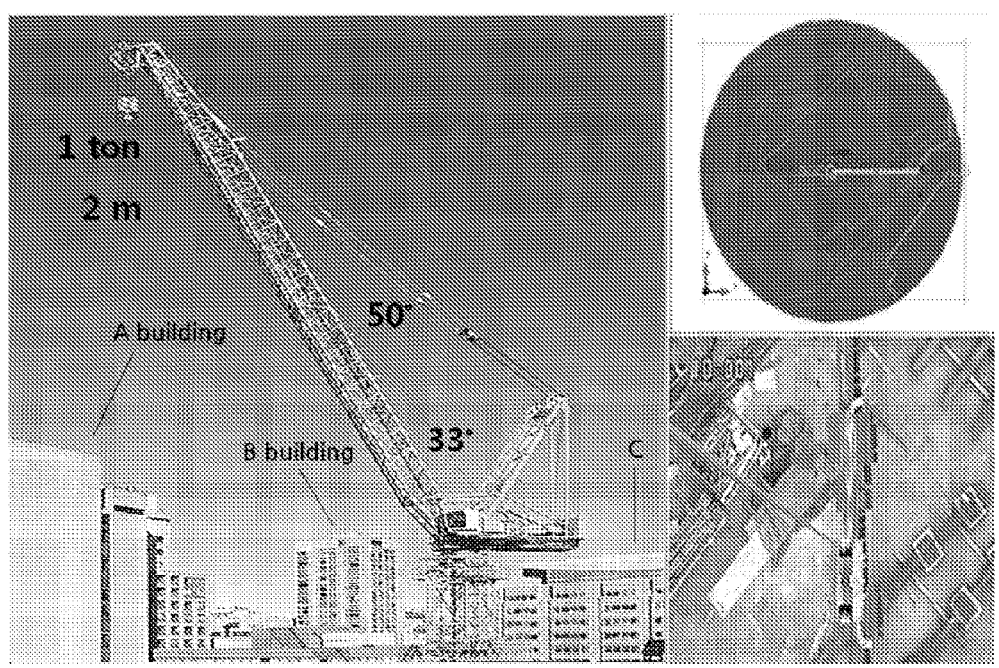
FIG. 15 shows an example of an image rendered on the screen of the display using the augmented reality technology according to an embodiment of the invention.

FIG. 15 shows an example of an image which is displayed on the screen of the display unit 700 using the augmented reality technology according to an embodiment of the invention.

The left part of the screen of FIG. 15 displays an image of the side shape of the tower crane, which is taken using an actual camera instead of being virtually expressed in graphics. This provides a more accurate shape of movement of the tower crane to the operator. In addition, the information about the structures (building A and building B) surrounding the tower crane is marked, so that the operator can intuitively match the display screen with the surrounding background which he/she can see from the cabin. Accordingly, the operator can more rapidly inspect the movement of the tower crane, the direction of movement of the tower crane, or so on.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A tower crane navigation system comprising:
   a material position information measuring section for measuring a position of a material lifted up by a tower crane;
   a structure information measuring section for measuring position information about structures within and/or beyond a working radius of the tower crane;
   a route searching section for searching for a route of movement of the material lifted up, from a start point to a destination;
   a route storage for storing the route of movement determined by the route searching section with respect to each tower crane;
   a data processing section for receiving data from the material position information measuring section and data from the structure information measuring section, and for calculating two-dimensional (2D) or three-dimensional (3D) image data which provides information about relative positions of the tower crane, the material lifted up by the tower crane and the surrounding structures; and
   a display unit for displaying information about at least one selected from the group consisting of the tower crane, the material lifted up by the tower crane and the surrounding structures, using the image data calculated by the data processor, and for displaying the route of movement determined by the route searching section,
   wherein the route searching section searches for the route of movement by carrying out one mode selected from the group consisting of a safety first mode, a productivity first mode and a previous route mode.

2. The tower crane navigation system according to claim 1, wherein, when two or more tower cranes are operative, the route searching section searches for routes of movement of each of the tower cranes, and when at least portions of the routes of movement of the tower cranes overlap each other, the route searching section re-sets the routes of movement of the tower cranes so that no routes of movement overlap each other.

3. The tower crane navigation system according to claim 1, wherein the safety first mode selects one route of movement, in which a distance between the tower crane and structures is greatest, among routes of movement along which the tower crane is maneuverable without colliding with the structures situated between the start point and the destination.

4. The tower crane navigation system according to claim 1, wherein the productivity first mode selects one route of movement, which has a shortest distance of travel while a distance between the tower crane and structures is equal to or greater than a reference distance, among routes of movement along which the tower crane is movable without colliding with the structures between the start point and the destination.

5. The tower crane navigation system according to claim 1, wherein the previous route mode selects one route of movement along which the tower crane moved previously.

6. The tower crane navigation system according to claim 1, further comprising a control section for controlling the tower crane using the data from the material position information measuring section, the structure information measuring section and the route searching section.

7. The tower crane navigation system according to claim 1, wherein the material position information measuring section comprises at least one selected from the group consisting of a global positioning system (GPS) device, a camera, a laser sensor, an angle sensor, a slewing sensor, a load cell and an encoder sensor.

8. The tower crane navigation system according to claim 1, wherein the structure information measuring section comprises a structure data providing section for presenting the position information about the structures depending on schedules of the structures, and
wherein the structure information measuring section measures the position information about the structures within and/or beyond the working radius of the tower crane using the structure data providing section.

9. The tower crane navigation system according to claim 1, further comprising an alarming section for generating a route deviation alarm when an actual route of movement of the material deviates from the route of movement determined by the route searching section.

10. The tower crane navigation system according to claim 1, further comprising an alarming section for generating a collision danger alarm when the tower crane reaches closer than a reference distance to the structure in which the tower crane is expected to collide with the structure, based on the data of the material position information measuring section.

11. The tower crane navigation system according to claim 1, wherein the display unit displays at least one piece of information selected from the group consisting of a route of movement determined by the route searching section, a direction of movement of the tower crane, a speed of movement of the tower crane and the information about the structures using a head-up display method.

12. The tower crane navigation system according to claim 1, wherein the display unit displays information about the tower crane, the material lifted up by the tower crane or the structures, on a separate display, or with a head-up display using augmented reality technology in a tower crane cabin.

13. The tower crane navigation system according to claim 1, wherein the display unit operates in one mode of:

a first display mode in which at least two images selected from among a side view image of the tower crane and the surrounding structures, a top down view image of the tower crane and the surrounding structures and a top down view image of the material, provided by a camera disposed on the tower crane, are presented in divided areas, and a second display mode in which one image selected from among the side view image of the tower crane and the structures, the top down view image of the tower crane and the structures and the top down view image of the material, provided by a camera disposed on the tower crane, is presented on one full screen, wherein the first display mode and the second display mode are switchable each other.

14. The tower crane navigation system according to claim 2, wherein the routes of movement of the tower cranes are re-set such that a sum of the routes of movement of the tower cranes is a minimum value.

15. The tower crane navigation system according to claim 3, wherein the selected route of movement of the material of the tower crane is compensated for in consideration of positional displacements of the material which are calculated from multiple variables, including a direction and speed of wind, which are externally provided in real time or measured by a wind speed sensor and a wind direction sensor disposed on the tower crane, and a weight of the material which is lifted up by the tower crane.

16. The tower crane navigation system according to claim 7, wherein the structure data providing section provides a three-dimensional structure data which is updated depending on a progress of the schedules of the construction.

17. The tower crane navigation system according to claim 12, wherein, in the first display mode, sizes of the divided areas, in which the side view image of the tower crane and the surrounding structures, the top down view image of the tower crane and the surrounding structures or the top down view image of the material, provided by the camera disposed on the tower crane, are displayed, can be adjusted.

18. The tower crane navigation system according to claim 15, wherein, when two or more tower cranes which are operative and the routes of movement of the tower cranes determined by the route searching section overlap partly each other, the control section controls the tower cranes having the overlapping path of the routes of movement to pass through the overlapping path at different time slots.

19. The tower crane navigation system according to claim 16, wherein, when the route deviation alarm is generated, the display unit displays content of the alarm and a route of movement along which the tower crane is to return to the predetermined route of movement.

20. The tower crane navigation system according to claim 19, wherein, when the collision danger alarm is generated, the display unit displays content of the alarm on a screen and displays a returning route along which the tower crane is to avoid a collision.

21. The tower crane navigation system according to claim 12, wherein, in the first display mode, positions of the divided areas, in which the side view image of the tower crane and the structures, the top down view image of the tower crane and the structures or the top down view image of the material, provided by the camera disposed on the tower crane, are displayed, can be exchanged with each other.

22. The tower crane navigation system according to claim 12, wherein, when the tower crane rotates, the side view image of the tower crane and the surrounding structures or the top down view image of the tower crane and the surrounding structures is displayed in one of:
- a first rotation mode image in which the tower crane is fixed but the surrounding structures rotate, and
- a second rotation mode image in which the surrounding structures are fixed but the tower crane rotates, and
- wherein the first rotation mode image and the second rotation mode image are switchable each other.

\* \* \* \* \*